(12) United States Patent
Koponen et al.

(10) Patent No.: US 7,177,277 B2
(45) Date of Patent: Feb. 13, 2007

(54) METHOD FOR OPTIMIZING PERFORMANCE IN WIRELESS NETWORKS

(75) Inventors: Juha Koponen, Helsinki (FI); Janne Kalliola, Espoo (FI); Hannu Mallat, Espoo (FI); Hannu Kari, Veikkola (FI)

(73) Assignee: First Hop Oy, Helsinki (FI)

( * ) Notice: Subject to any disclaimer, the term of this patent is extended or adjusted under 35 U.S.C. 154(b) by 886 days.

(21) Appl. No.: 09/957,336

(22) Filed: Sep. 20, 2001

(65) Prior Publication Data

US 2003/0043777 A1 Mar. 6, 2003

(30) Foreign Application Priority Data

Aug. 31, 2001 (FI) .................................. 20011746

(51) Int. Cl.
*H04J 3/24* (2006.01)
(52) U.S. Cl. ..................... 370/235; 370/345; 370/477
(58) Field of Classification Search ................ 370/349, 370/229–231, 412, 468, 235, 236.1, 252, 370/253, 278, 395.42, 329, 335, 342, 441, 370/437–438, 522; 455/452.2
See application file for complete search history.

(56) References Cited

U.S. PATENT DOCUMENTS

| | | | | | |
|---|---|---|---|---|---|
| 5,235,595 | A | * | 8/1993 | O'Dowd .................... | 370/392 |
| 6,018,516 | A | | 1/2000 | Packer | |
| 6,118,765 | A | | 9/2000 | Phillips | |
| 6,144,996 | A | * | 11/2000 | Starnes et al. .............. | 709/217 |
| 6,211,881 | B1 | * | 4/2001 | Gabler et al. ............... | 345/418 |
| 6,300,959 | B1 | * | 10/2001 | Gabler et al. ............... | 345/473 |
| 6,317,418 | B1 | * | 11/2001 | Raitola et al. .............. | 370/278 |
| 6,389,460 | B1 | * | 5/2002 | Stewart et al. .............. | 709/217 |
| 6,449,658 | B1 | * | 9/2002 | Lafe et al. ................... | 709/247 |
| 6,510,469 | B1 | * | 1/2003 | Starnes et al. .............. | 709/247 |
| 6,578,073 | B1 | * | 6/2003 | Starnes et al. .............. | 709/219 |
| 6,587,985 | B1 | * | 7/2003 | Fukushima et al. ......... | 714/748 |
| 6,590,893 | B1 | * | 7/2003 | Hwang et al. .............. | 370/354 |
| 6,601,207 | B1 | * | 7/2003 | Vanttinen .................... | 714/748 |

(Continued)

OTHER PUBLICATIONS

"Nonintrusive TCP Connection Admission Control for Bandwidth Management of an Internet Acces Link", Anurag Kumar et al. IEEE Communications Magazin, vol. 38, Issue 5, May 2000. ISSN 0163-6804.

(Continued)

*Primary Examiner*—Ricky Q. Ngo
*Assistant Examiner*—Brian Roberts
(74) *Attorney, Agent, or Firm*—Shalom Wertsberger; Saltamar Innovations (57) ABSTRACT

A system and method for optimizing Internet data transmission so that end-user experience is the best possible. The invention has at least one class set for estimating the network load, wherein each class set consists of classes. The method estimates the network load by each class of the class set. The estimation may be based on counting retransmission requests or packet acknowledgements related to class sets. For example, a class set may consist of classes so that there is a class per each cell of the network. Then the method detects which packets cause a lot of retransmission requests and thus a lot of retransmissions. The method can intelligently target its acceleration actions to certain packets. Four new acceleration actions can be used together with the prior art acceleration actions to accelerate the network traffic.

35 Claims, 5 Drawing Sheets

U.S. PATENT DOCUMENTS

| | | | | |
|---|---|---|---|---|
| 6,810,488 | B2* | 10/2004 | Teng | 714/4 |
| 6,836,862 | B1* | 12/2004 | Erekson et al. | 714/704 |
| 6,987,730 | B2* | 1/2006 | Hata et al. | 370/232 |
| 2001/0001268 | A1* | 5/2001 | Menon et al. | 370/329 |
| 2002/0009157 | A1* | 1/2002 | Sipola | 375/295 |
| 2002/0010758 | A1* | 1/2002 | Chan | 709/218 |
| 2002/0010765 | A1* | 1/2002 | Border | 709/220 |
| 2002/0016851 | A1* | 2/2002 | Border | 709/234 |
| 2002/0107971 | A1* | 8/2002 | Bailey et al. | 709/231 |
| 2002/0108059 | A1* | 8/2002 | Canion et al. | 713/201 |
| 2002/0133621 | A1* | 9/2002 | Marco et al. | 709/240 |
| 2002/0169818 | A1* | 11/2002 | Stewart et al. | 709/202 |
| 2002/0194350 | A1* | 12/2002 | Lu et al. | 709/229 |

OTHER PUBLICATIONS

"Network Congestion Monitoring and Detection Using the Infrastructure Paralell Processing", Takeo Saioh et al., Proceedings, 1999 International Conference on. On pp. 462-469, Sep. 21-24, 1999, Aizu-Wakwamatsu, Japan, ISVBN 0-7695-0350-0.

"TCP-SMART: A technique for Improving TCP Performance in a Spotty Wide Band Environment" Moncef Elaoud et al. Communications, 2000 ICC 2000. 2000 IEEE int. Conf. pp. 1783-1787, vol. 3, Jun. 18-22, 2000, New Aurleans, LA ISBN: 0-7803-6283-7.

* cited by examiner

FIG. 1

CLASS SET 1    STATISTICAL TABLE 1

| RECEIVER OF PACKETS | RETRANSMISSION REQUESTS |
|---|---|
| USER 223456 | 3 |
| USER 439888 | 0 |
| USER 601033 | 13 |
| . . . | . . . |
| USER 244967 | 2 |

FIG. 2A

CLASS SET 2    STATISTICAL TABLE 2

| NETWORK AREAS | PACKETS SENT | PACKET ACKNOWLEDGEMENTS |
|---|---|---|
| 001 | 67 | 64 |
| 002 | 25 | 21 |
| 003 | 133 | 133 |
| . . . | . . . | . . . |
| 127 | 52 | 49 |

FIG. 2B

CLASS SET 3    STATISTICAL TABLE 3

| CONTENT OF PACKETS | PACKETS SENT | RETRANSMISSION REQUESTS | NORMAL RATIO |
|---|---|---|---|
| WORD TEXT | 1230 | 31 | 0.03 |
| ASCII TEXT | 334 | 2 | 0.01 |
| GIF PICTURE | 126 | 14 | 0.10 |
| . . . | . . . | . . . | . . . |
| JAVA APPLET | 5477 | 475 | 0.12 |

METHOD FOR OPTIMIZING PERFORMANCE IN WIRELESS NETWORKS

FIELD OF THE INVENTION

The present invention is related to an accelerating system and upgrading performance and transmission capacity in a wireless network, such as a GPRS (General packet Radio Service) network.

BACKGROUND OF THE INVENTION

As the Internet has become very successful, the efforts to bring the Internet also to mobile and wireless devices have been considerable. Most of the prior art techniques presently in use are based on the global system for mobile communications (GSM) standard.

The services enabling communication between a mobile station and an Internet ser-vice are termed bearer services. Some bearer services are circuit-based and some message-based. Circuit-based communication requires a certain size of bandwidth allocation regardless of its usage. On the other hand, message-based communication does not require a certain size of bandwidth allocation but it uses the bandwidth avail-able.

Circuit switched data (CSD) and high-speed circuit switched data (HSCSD) are examples of circuit-based bearer services. General packet radio services (GPRS) is an example of a message-based service.

According to GSM/GPRS parlance, a mobile station is a GPRS radio device, such as a GPRS phone, a GPRS PCMCIA card or a built in GPRS radio that may be integrated to a variety of devices. A mobile client device is, for example, a laptop or a personal digital assistant (PDA). A mobile client device communicates with a server located in a GPRS network. An end-user is a person having a mobile client device.

The Internet is a packet switched network whose nodes have an Internet peripheral address (IP address). Each IP address consists of four numbers between 1 and 255, and dots separating each number; for example, 193.199.35.5. Internet addresses are divided into a network address and a host address. The division between host and network address is controlled by a netmask. The routers of the Internet locate the correct receiver by its IP address. Since the Internet is a packet-switched network, no circuit is allocated for the connection. Instead, documents are transmitted in packets from the sender to the receiver, and packets of other connections may be transmitted in the same circuit.

An IP packet usually includes 1–1500 characters. The small size of a packet ensures that transmission capacity, or the lack of the capacity, is divided between end users of a network. Each IP packet includes the following information: from which node a packet is sent, to which node it is sent, which application will receive the packet, and what is its serial number. The serial numbers of packets are required when the content of a document will be composed at the receiving site. Transmission control protocol/Internet protocol (TCP/IP) is a set of protocols that determine how IP packets are transmitted in the Internet.

When using TCP/IP the packets have a sequence number. Thus, a receiver can detect if one or more packets are missing. Then the receiver sends a retransmission request for each missing packet. In another protocol a receiver may send an acknowledgement message in response to receiving a packet or a group of packets. User datagram protocol (UDP) is the most common alternative to TCP/IP. UDP offers a transmission with a minimum of protocol overhead. Therefore retransmission requests or packet acknowledgements are not used in UDP. For the same reason a sender cannot know whether a receiver has received the packets sent.

The world wide web (WWW or web) is an Internet-based, distributed hypermedia information system. The web pages are traditionally represented using hypertext markup language (HTML). HTML and its successor, extensible markup language (XML), are intended for forming structured documents to be interchanged in the web. Structured documents are searched and read through software that is termed a browser. Hypertext transfer protocol (HTTP) determines how structured documents are transferred in the Internet.

Wireless markup language (WML) is a formal language that allows the text portions of structured documents to be presented via wireless network on mobile client devices. WML is a part of wireless application protocol (WAP).

Though the computing capabilities of mobile client devices as well as the Computing capabilities of the Internet servers have increased, the transmission capacity of a bearer service has remained rather low. It has become feasible to carry out extensive real-time optimisations of the traffic. An end-user may access the Internet via the networks based on CSD or HSCSD bearer service. Because these bearer services allocate a certain amount of bandwidth, the bandwidth capacity of a network is poorly utilized. To be more specific, quite a limited number of end-users can use the network at the same time. The number of simultaneous end-users is much higher in a network based on GPRS bearer service.

GPRS supports TCP/IP protocols and their packet nature over a wireless network. The upper limit of transmission capacity is in theory about 170 kb/s per end-user. However, a GPRS is a connectionless bearer service. Therefore a varying number of end-users may use the same channel at the same time and the transmission capacity per end-user varies depending on the number of simultaneous end-users. In practice, the transmission capacity per end-user is in the order of 10-30 kb/s. Thus, end-user experience is slightly better with the GPRS communication than with the CSD communication of 9.6 kb/s, but worse than with the HSCSD communication of 43.2 kb/s. Though GPRS increases the number of simultaneous end-users compared to CSD and HSCSD, its transmission capacity is relatively low.

Universal mobile telecommunications system (UMTS) is a part of the International Telecommunications Union's (ITUs) vision of a global family of third-generation mobile communications. UMTS will deliver low-cost, high-capacity mobile communications offering data rates up to 2 Mb/s.

TCP/IP protocols and especially HTTP are best suited for high-speed, fixed networks. Many Internet applications operate badly in GPRS networks. The performance of Internet applications can be improved by software termed an accelerating system. Also the term "performance enhancing proxy" has been used in the prior art.

An accelerating system includes at least an accelerating server connected to a network, and optional accelerating clients placed in end-users' mobile client devices. There are two kinds of solutions: a client-server solution or a server solution. The client-server solution includes the accelerating clients and server. The server solution includes only the accelerating server.

Packing is an acceleration technique that is most widely used. There are several packing algorithms usable for packing the content of packets. The packing reduces the transmission capacity needs, thus the transmission is accelerated compared to the transmission of unpacked packets.

Figure 1:
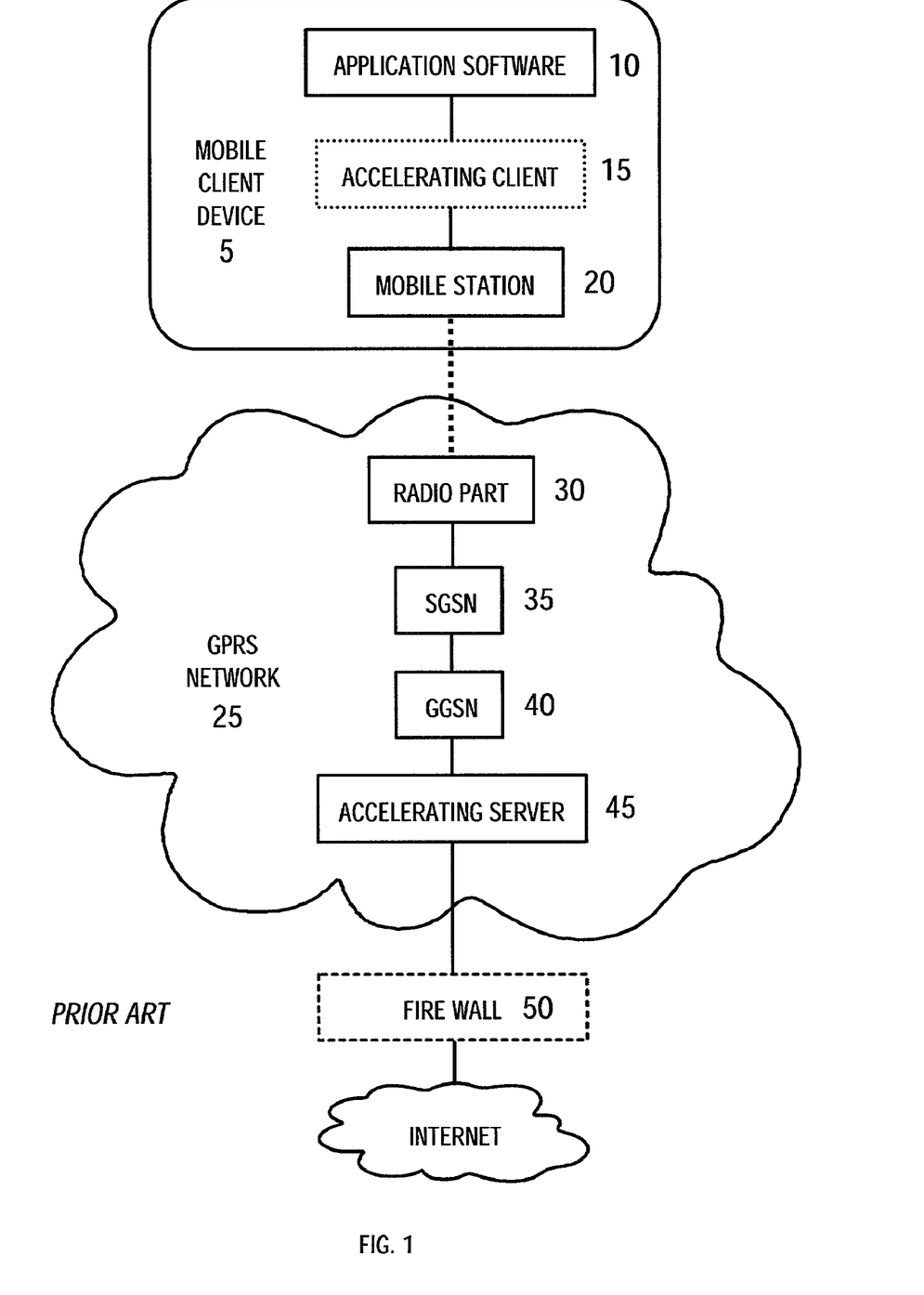
FIG. 1 shows a sample operation environment of an accelerating system.

FIG. 1 describes the architecture of a GPRS network attached to the Internet. A mobile client device 5 uses the Internet and its services via the GPRS network 25. A firewall 50 is placed between the GPRS network and the Internet. The mobile client device includes at least a mobile station 20 and application software 10 such as a browser, by way of example. The mobile client device may also include an accelerating client 15 operating between the mobile station 20 and the application software 10. The GPRS network includes a radio part 30, a serving GPRS support node (SGSN) 35, a gateway GPRS support node (GGSN) 40, and an accelerating server 45. Generally, the radio part 30 comprises a base stations and corresponding infrastructure used in GPRS networks.

The European telecommunications standards institute (ETSI) has defined GPRS and the operation of the SGSN and GGSN nodes; service description, stage 2, GSM 03.60 version 7.4.1 Release 1998 and ETSI EN 301 344, V74.1, 2000-09.

The SGSN and GGSN are also used in UMTS. Their functionality is very similar in UMTS and GPRS networks. Thus, the following description of the SGSN and GGSN also concerns UMTS.

The GGSN is connected to the packet switched-networks external to the GPRS system, for example, the operator specific intranet or external Internet. When end-user data is transmitted between the GGSN and a mobile station, it is tunneled by using GPRS specific packet headers. The headers are added to IP packets. One function of the GGSN is collecting charging and billing data. Depending on the network operator, the charging may be based on the amount of bits sent between the mobile station and the Internet. Also fixed charges may be possible. Typically, the traffic from a mobile station to the Internet, and vice versa, is billed.

The SGSN keeps track of the individual mobile station's location and performs security functions and access control. The SGSN is connected to a radio part (see FIG. 1) and its tasks include collecting charging data.

The SGSN and GGSN act as relay functions. They store and transfer packets which are termed PDP PDUs (packet data protocol, protocol data units). PDP may be the Internet, X.25, or corresponding protocol. The SGSN, as well as the GGSN, has a buffering window for storing the packets for a maximum holding time. A buffering window can be also termed a buffer with a certain size, for example 64 kB. If the buffering window is full or the maximum holding time is reached, the packets are discarded. The discarding protects the resources of a radio part from useless transfer attempts.

The GGSN collects billing information based on the amount of bytes of packets going through the GGSN. If the buffering window of the SGSN is full or the maximum holding time of the SGSN is reached, packets are discarded. However, the GGSN charges for all the packets transmitted to the SGSN. Therefore an end-user is sometimes billed for packets that he/she has never received. The buffering window size and maximum holding time may vary depending on the load of a GPRS network, but both of them are, of course, limited.

The accelerating systems known in the prior art still have certain drawbacks, which are discussed next.

The first drawback is that when the load of a GPRS network is high, a lot of packets are discarded, which causes slowness in the usage of Internet services.

The second drawback is that billing based on the amount of transmitted bits is erroneous when packets are discarded in the SGSN.

The third drawback is that repeatedly retransmitted packets may cause overload in a GPRS network, especially in the SGSN.

The fourth drawback is that acceleration actions are not necessarily targeted to those packets which cause the overload of a network.

SUMMARY OF THE INVENTION

The objects of the invention are to solve the above-mentioned drawbacks. Due to overall network bandwidth limitations, individual end user experience also varies, and it is desirable to fairly divide the available bandwidth between all users. A method in accordance with the present invention optimizes the Internet data transmission so that end-user experience is the best possible.

The method has at least one class set for estimating the network load, wherein each class set consists of classes. The method estimates the network load by each class of the class set. For example, a class set may consist of classes so that there is a class per each cell of the network. (in these specifications, the word cell is used equivalently to a network node.) Then the method may detect, for example, that the packets sent to a certain cell cause a lot of retransmission requests and thus a lot of retransmissions. In this way the method can target acceleration actions especially to the packets causing the overload.

The method preferably estimates the network load by counting retransmission requests or packet acknowledgements related to the above-mentioned class sets. Therefore at least a portion of the network traffic would preferably operate in accordance with a protocol containing retransmission requests or packet acknowledgements. Alternative method of estimating network load is by measuring or estimating the total level of network traffic, or a portion thereof as described above. The example provided herein relates primarily to activating accelerating actions in response to retransmission requests and acknowledgement count. It should be clear however that the invention is equally applicable to triggering those actions responsive to other network utilization indicators, relating to the whole network or to portions such as geographical areas, individual or groups of subscribers, etc.

An aspect of the invention includes four new acceleration actions that can be used independently or in combination within themselves as well as together with the prior art acceleration actions to accelerate the network traffic.

The first new acceleration action is termed "prioritizing". Prioritizing means that the packets to be transmitted via the GGSN to the SGSN are given a priority. Then the SGSN handles its buffering window as follows: if the buffering window is full or the maximum holding time is reached, the SGSN removes one or more packets having the lowest priority.

The second new acceleration action is termed "buffering". Buffering means that certain packets are placed in a buffer. Buffering is an alternative to prioritizing, or it may cooperate therewith. Generally speaking, less important packets are placed in a buffer. Different packet types have different impacts on the end user experience. For example a large number of dropped voice or music packets will severely impact the end user listening experience, while dropping an advertisement in a web page will likely have a positive impact. Differentiation between packet types may be carried out by marking certain packets in a manner indicative of their content or by their protocols.

The third new acceleration action is termed "ordering". Ordering means the transfer order of the packets is changed so that important packets are transferred before less important packets. Ordering requires buffering, i.e. packets are placed in the buffer.

The fourth new acceleration action is termed "filtering". Filtering differs from packing, which is known in the art, in that filtering purposely reduces the quality of content. For example, if the content is a video, the resolution of the video can be reduced. There are several ways to reduce the quality of videos or other audio and/or visual information. Filtering also concerns the quality of text. A formatted piece of text, such as a Word document, can be transformed to plain text, e.g. to ASCII text. Thus filtering allows the total transferred bit volume to be reduced.

Various aspects of the invention enable operator-specific, user-specific, group-specific, and content provider-specific acceleration settings that determine how and when the optimization is performed, i.e. which acceleration actions are used in a certain case.

BRIEF DESCRIPTION OF THE DRAWINGS

The invention is described more closely with reference to the accompanying drawings, in which.

DETAILED DESCRIPTION OF THE INVENTION

One aspect of the invention provides for counting the number of packets sent and/or the number of retransmission requests by using at least one class set. A class set may concern, for example, the content of packets. Or, a class set may concern network areas. A network area could be e.g. the geographical area of a cell.

Figure 2A:
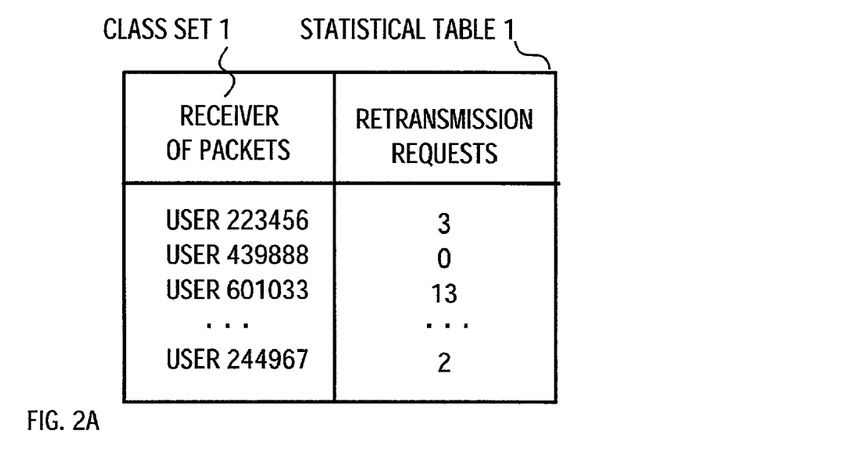
FIG. 2A shows a data structure example in which the receiver of packets is used as members of classes of a class set.

FIG. 2A shows an example in which the receiver of packets is used as a class set 210. The counting results in a statistical table. By way of example, the statistical table indicates that relatively many retransmission requests have arisen from the packets of user 601033. The normal level of retransmission requests could be e.g. five retransmission requests within one minute. At the beginning of each minute the counter values of the table could be set at zero.

Figure 2B:
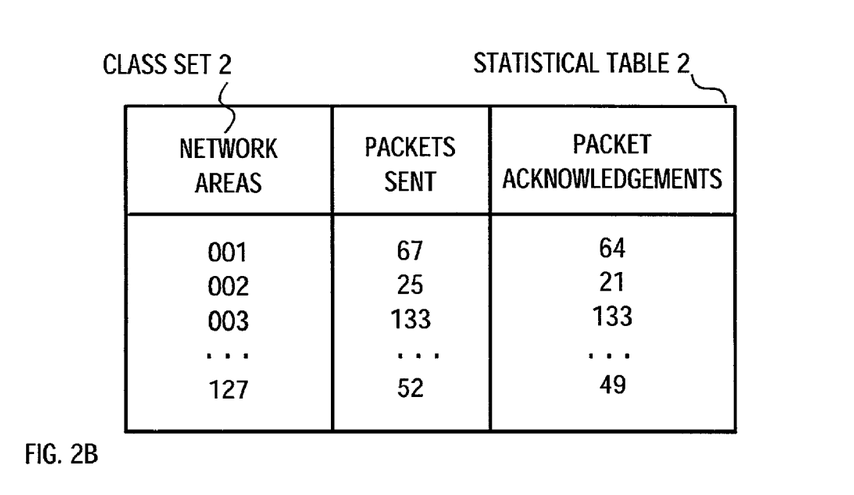
FIG. 2B shows a data structure example in which network areas are used as members of classes of a class set.

FIG. 2B shows an example in which network areas are used as a class set. The counting results in another statistical table. The table indicates that relatively few packet acknowledgements have arisen from the packets sent to network area 002. The normal ratio of packet acknowledgements to the number of packets sent could be e.g. ninety percent within a certain time period.

Figure 2C:
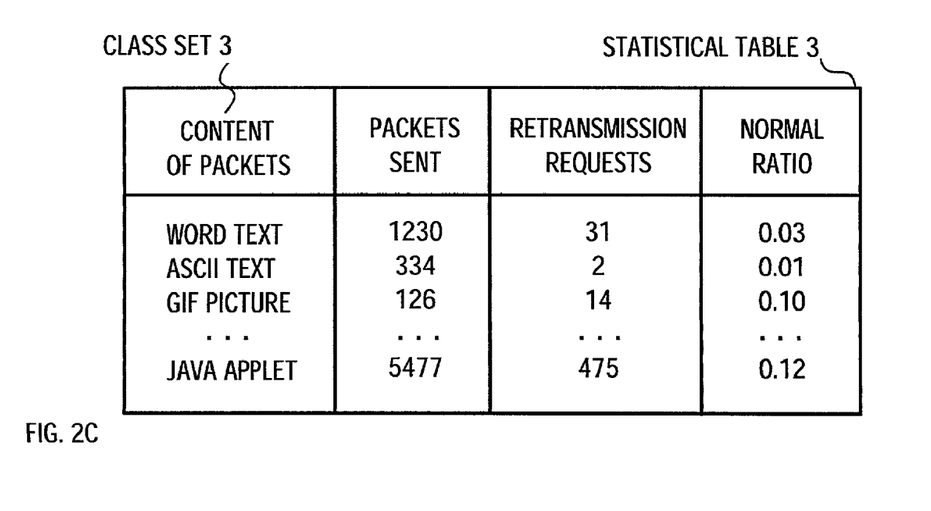
FIG. 2C shows a data structure example in which the content of packets is used as members of classes of a class set.

FIG. 2C shows an example in which the content, or the type of content of packets is used as a class set. The normal ratio of retransmission requests to the number of packets sent may vary as shown in statistical table 3. The table indicates that fourteen retransmission requests have arisen from GIF pictures and the normal ratio related to GIF pictures, i.e. 0.10, has been currently exceeded.

Each class set composes a statistical table in which each class of the class set is related to the current number of retransmission requests. In addition, each class of the class set can be related to at least one predefined level for retransmission requests.

Alternatively, each class set composes a statistical table in which each class of the class set is related to the current number of the packets downloaded and the current number of packet acknowledgements. In addition, each class or each class of the class set can be related to at least one predefined level for a ratio between the packet acknowledgements and the number of the packets downloaded.

A predefined level may define the normal level of unsuccessful transmission. Exceeding that predefined level triggers acceleration actions which should accelerate the network traffic and drive the volume of unsuccessful transmission to the normal level or preferably under it. However, a predefined level may also define other parameters and ratios such as, for example, a user-specific or user specified level of communication events, so that exceeding or falling below said level starts such acceleration actions which should improve the end-user experience. In this case, reduction of network may be of secondary importance.

The number of active end-users, radio interferences, and corresponding features varies in the cells of a network. At a certain time a lot of retransmission requests may arise in some network areas and in other network areas only a few. A preferred embodiment of the invention avoids a block that causes an overload in the SGSN 35. The block might arise as follows: 1) packet transmission fails in a certain area, 2) the SGSN receives retransmission requests from a radio part 30 and transmits them via the GGSN 40 and the accelerating server 45 to the Internet, 3) the packets to be retransmitted are stored in the buffering window of the SGSN, 4) the packets and other packets are discarded because their maximum holding time is reached, and 5) retransmission requests are received when the receiving stations attempt to complete the interrupted transmission sequence. During the block the buffering window of the SGSN is full or almost full and the processor time is wasted for handling the buffering window.

The system avoids a block in the SGSN by either prioritizing or buffering packets in the accelerating server. The prioritizing/buffering is based on at least one class set and the statistics resulting from the calculation. For example, the accelerating server may maintain the tables shown in FIGS. 2A and 2B. In this case the accelerating server detects that a lot of retransmission requests have arisen from the packets containing GIF pictures and the packets sent to network area 002. Therefore the accelerating server stores the packets related to the said retransmission requests in the buffer. The accelerating server continues the prioritizing/buffering until the normal level of retransmission requests is reached, or until some predefined level of retransmission requests is reached. Of course, the buffering causes that certain end-users do not receive all packets, which disturbs their activities. However, their billing is correct, i.e. end-users are charged only for the packets they have received.

Figure 3:
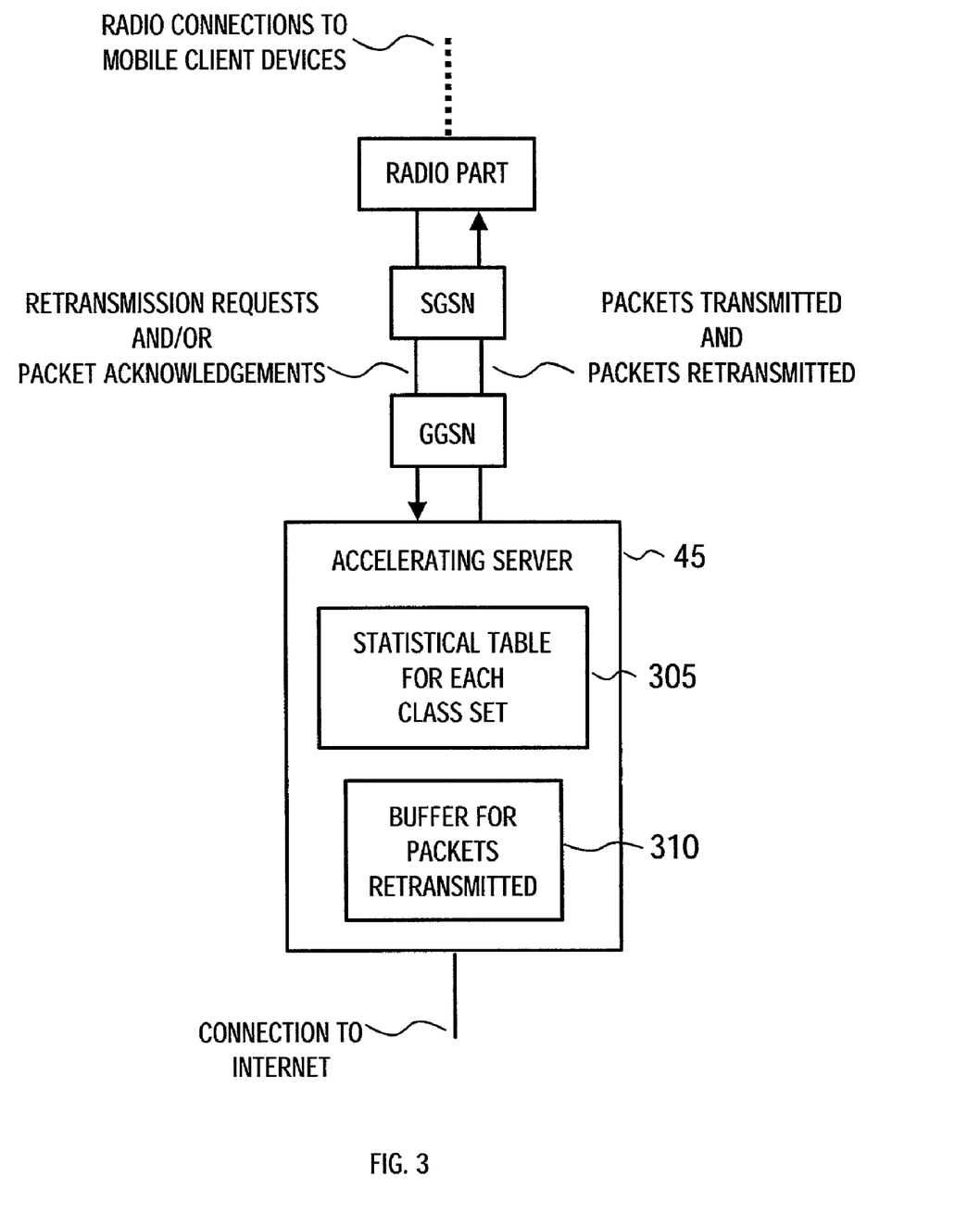
FIG. 3 shows a schematic block diagram of an accelerating server with statistical tables and a buffer, in accordance with a preferred embodiment of the invention.

FIG. 3 shows the accelerating server 45 equipped with at least one statistical table 305 and at least one buffer 310. As in the prior art, the accelerating server receives retransmission requests as well as packet acknowledgements from a radio part 30. If required, the accelerating server buffers the packets before sending them to the radio part. The accelerating server uses the statistical tables when it determines: 1) which packets are to be prioritized/buffered, and 2) when prioritizing/buffering is to be stopped.

Figure 4:
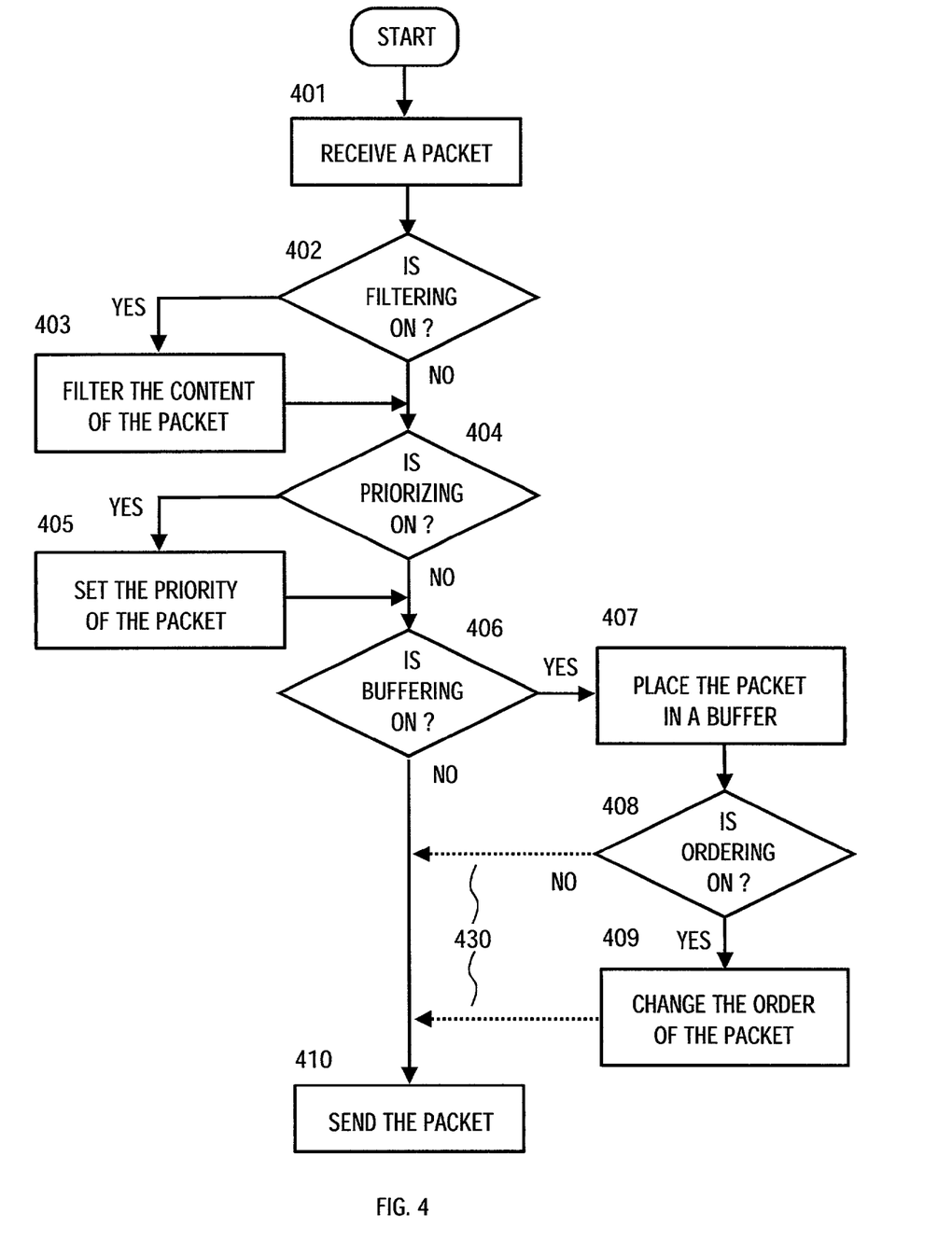
FIG. 4 shows a general flow diagram for execution of new acceleration actions in accordance with the preferred embodiment.

FIG. 4 shows a preferred embodiment flow diagram depicting execution of the new acceleration actions. At first the accelerating server receives a packet from the Internet (401). If filtering is on (402) the accelerating server filters the content of the packet (403). In certain protocols, filtering reduces the quality of the content of the packet. Preferably, filtering is executed before buffering because it reduces the size of the packet and therefore more packets can be placed in a buffer. If prioritizing is on (404) the accelerating server sets a priority in the frame of the packet (405). If buffering is on (406) the accelerating server places the packet in the buffer (407). Buffering is an alternative to prioritizing. If ordering is on (408) the accelerating server changes the sending order of packets in the buffer (409). Ordering requires that buffering is executed. Lastly, the accelerating server sends the packet to the radio part (410).

As can be seen in FIG. 4, it is possible that no acceleration action is executed for the packet. Two dashed line arrows 430 indicate a packet that is placed in a buffer, but not sent to the radio part 30 until the load of a network is sufficiently low. The accelerating server continuously estimates the load by using its statistical tables. The accelerating server obeys accelerating settings when it determines: "Is filtering on?" (402), "Is prioritizing on?" (404), "Is buffering on?" (406), and "Is ordering on?" (408).

Thus, there are four new acceleration actions. In addition, some prior art acceleration actions, such as packing, can be executed for a packet before sending it to the radio part. Next the new acceleration actions are described in detail and after that the accelerating settings.

Prioritizing is a transparent acceleration action, i.e. packets are not modified. The accelerating server marks packets with a priority identifier. Marking can be done for example, by adding an information header to a packet. For example, the packets with priority identifier 1 have higher priority than the packets with identifier 2. There can be arbitrarily many levels of priorities.

Special software needs to be installed in the SGSN that can then read the priority identifiers of the packets and determine which packets should be discarded. For example, if the total size of the stream is 40 kb/s, and one half of the packets are marked with priority 1 and the other half of the packets with priority 2, the SGSN discards the packets with the lower priority 2. After that, the mobile terminal receives a stream of 20 kb/s including all the packets with priority 1.

This is especially advantageous if the stream is coded so that by dropping the lower priority packets the stream does not break, but its quality, such as picture resolution or color richness is downgraded. For example, MPEG4 is a streaming standard supporting this feature.

If there is a stream of which the full rate is 75 kb/s, it can be prioritized as follows: priority 1 with 5 kb/s contains the audio data, priority 2 with 10 kb/s contains the coarsest graphical information, priority 3 with 20 kb/s contains more graphical information, and priority 4 with 40 kb/s contains even more graphical information.

If this stream would be used for example for video conferencing, the end user would always receive at least the tone if the minimum bit rate would be 5 kb/s. The full 75 kb/s would provide the full quality. The benefits are that 1) the stream would not be broken and 2) the packet discard in SGSN would be done intelligently.

Buffering is a transparent acceleration action. The buffer size can be deduced from the number of retransmission requests or other similar phenomena. The buffer size should dynamically change if also the buffering window size of the SGSN or GGSN dynamically changes, for example, depending on the network load.

Preferably, the buffer is located in the accelerating server. The buffering is based on at least one class set and a statistic resulting from a calculation. For example, the content of packets can be used as a class set. In this case the accelerating server counts the quantities related to different content types, such as text, picture, program, etc. The accelerating server may count, for example, the number of packets sent and the number of retransmission requests. The said calculation results in the statistic whereby a predefined level of retransmission requests is determined.

When there are a lot of retransmission requests, the predefined level is exceeded and the buffering is started. Then the accelerating server stores the packets related to the retransmission requests in the buffer. The accelerating server may continue the buffering until the predefined level of retransmission requests is reached.

Ordering is a transparent acceleration action. Also this acceleration action uses a buffer. Thus, certain packets are transferred at once and certain other packets are stored in the buffer and transferred later.

For example, if a web page includes graphic images as well as text, the packets containing the images can be stored in the buffer and transferred later if required. Another example concerns emails. If emails are downloaded, and at the same time, web pages are accessed, it is possible to guarantee a certain fraction of the bandwidth for the emails.

Filtering is not a transparent acceleration action, i.e. information is removed. The filter manipulates packets so that their size decreases. This can be done in many ways: some packets can be dropped, the format of files can be changed, unnecessary features may be taken away etc. An example of a very crude filter is the filter which transforms Microsoft Word*.doc files to pure ASCII form.

The filtering of data streams is very important when reducing load in a GPRS network. This applies also to the streams in UMTS. The data streams to be filtered may be audio/video streams. The quality of a video stream can be downgraded, for example, by decreasing the resolution, by changing the picture format, or by changing a color stream to a black and white stream. Similar downgrading can also be done for audio streams.

The stream downgrading heavily loads the accelerator server. If this is made for each user individually, a very powerful server should be used. Instead, it is advantageous to define certain standard downgrading filters for the streams and make the stream downgrading only once per stream in accordance with a set of downgrading parameters. Downgraded streams are downloaded to the accelerator server and end-users can choose which stream they want to subscribe to.

The acceleration settings determine: 1) actions i.e. which acceleration actions a user wants to select, 2) targets i.e. how the selected acceleration actions are targeted, and 3) triggers i.e. which conditions trigger the selected acceleration actions.

The operator of an accelerating system has operator-specific values for the acceleration settings. Instead of the operator-specific values it is possible to use user-specific, group-specific, or content provider-specific values for the acceleration settings. However, if the predefined level of network load is exceeded, the operator-specific values are obeyed in order to treat the users with justice. The term "user experience" refers not only to end-user experience but also the experience of a group or a service provider, because a group or a service provider can be considered as the users of an accelerating system.

Figure 5A:
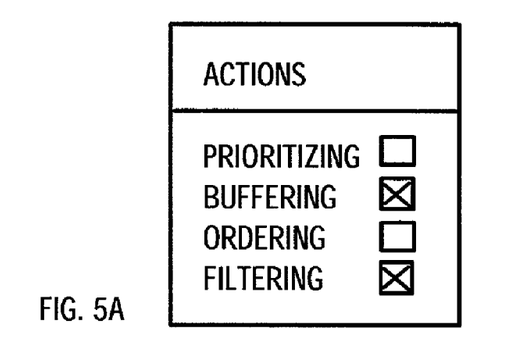
FIG. 5A shows an example of the actions selected by a user and included in the acceleration settings.

FIG. 5A shows an example of the acceleration settings, or more specifically, the actions selected by a user. In this case the user has selected buffering and filtering actions. Of course, more than four acceleration actions could be available. Although not shown in FIG. 5A, filtering action may have several levels which a user can select. Decreasing of the packet size would vary dependent on the levels.

The selected acceleration actions can be targeted, for example, as follows:
- Acceleration actions are targeted to a certain set of applications, for example, an email application might have a higher priority than a browser.
- Acceleration actions are targeted to a group of users.
- Acceleration actions are targeted to any combination of applications and users; i.e. to the packets related to the applications and/or users.

Figure 5B:
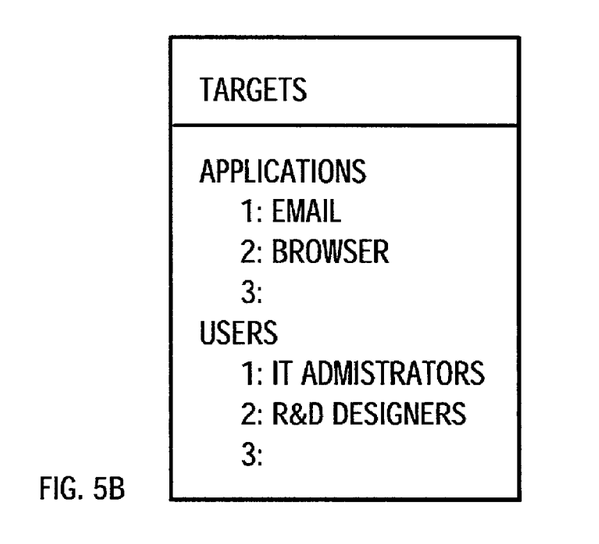
FIG. 5B shows an example of the targets of acceleration settings.

FIG. 5B shows an example of the targets related to the acceleration settings. In the example shown, target selection concerns applications and users. Preferably, each acceleration action may be associated with its own set of targets. Thus, if there are two selected acceleration actions as in the FIG. 5A, both the selected actions may have different set of targets.

Any combination of the following conditions may trigger the selected acceleration actions:
- When packets are coming from a certain Internet address or when the receiver of the packets is located in a certain place.
- The content of packets is a certain type, for example, text, figures, file formats such as HTML, protocols such as TCP/IP, UDP, HTML, etc.
- The amount of data to be transmitted exceeds a predefined level, or the volume of a certain type of transmission either exceeds or falls below a certain predefined level.
- An Internet content provider has paid the operator of the accelerating system to obtain high priority when accelerating traffic.

Figure 5C:
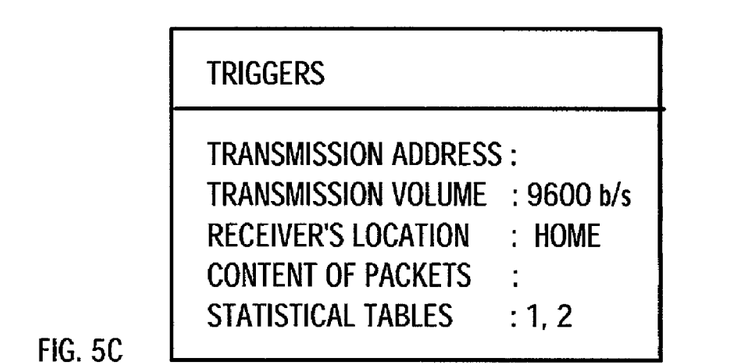
FIG. 5C shows an example of the triggers of the acceleration settings.

FIG. 5C shows an example of the triggers related to the acceleration settings. In this case transmission volume, receiver's location, and the statistical tables may trigger an acceleration action. Thus, if the transmission volume exceeds 9600 b/s, or the receiver of transmission locates at home, or statistical table 1 or 2 indicates that acceleration actions are needed, the selected acceleration actions are executed. The statistical table 1 could be e.g. the table shown in FIG. 2A and the statistical table 2 could be e.g. the table shown in FIG. 2B. Preferably, each acceleration action may be associated with the triggers of its own. Therefore both the selected actions in FIG. 5A may have its own set of triggers.

FIGS. 5A, 5B, and 5C include examples of the acceleration setting values and, as mentioned above, an operator, a user, a group, or a content provider may have its own values.

The embodiments of the invention concern many aspects of the composition of the accelerating system. The system is able to operate with or without client accelerators. If an end user has an accelerating client, the optimization is more efficient. If there is no accelerating client in a mobile client device, the accelerating server acts as a proxy gateway for application software installed in the mobile client device. The application software can be e.g. a browser.

If a client mobile device cannot find any accelerating server, it passes all the traffic through. The benefit is now that the proxy configurations in the client mobile device do not have to be altered. The client mobile device checks, for example, every 5 minutes whether the server is up. When it is up, the client mobile device starts to use the accelerating server.

Also the accelerating client may use buffering, especially for video streams. For example, when the accelerating client downloads one minute of a video stream, it could store the stream in the buffer in order to display a continuous video in the mobile client device.

An accelerating server is preferably duplicated so that a spare server can continue accelerating if the active server is for some reason out of order. If there is a lot of traffic it is preferable to compose a system that consists of a duplicated master server and a set of slave servers. Then the active master server forwards the packets to slave servers.

It is important to notice that there should be only one point in the network through which all the acceleration actions are coordinated. If there would be two or more accelerating servers accelerating traffic independently, i.e. without knowing each other's acceleration actions, the said servers would just worsen the traffic.

In FIG. 3 the SGSN 35, GGSN 40, and accelerating server 45 are separate devices. The SGSN obtains load information from the radio part, the GGSN handles charging, and the accelerating server executes acceleration actions. However, two or all three of them could be incorporated in a single device.

Optionally, it is possible to define a message interface between the SGSN and accelerating server so that the accelerating server would obtain additional load information other than retransmission requests and/or packet acknowledgements from the SGSN. Better load information could increase the performance of the accelerating system. It is also possible to define a message interface between the SGSN and GGSN so that the SGSN would inform the GGSN if it discards a packet. Then the GGSN could avoid erroneous charging.

A common message interface between the GGSN, SGSN, and accelerating server could be based on simple network management protocol (SNMP). SNMP is intended for the management of IP networks. Its approach of management is to view a network as a set of cooperative communicating nodes. In principal, there are two types of nodes: management nodes and managed nodes. Relating to an accelerating system, the accelerating server could be, for example, the manager node and the GGSN and SGSN the managed nodes.

An SNMP agent is software that resides on a managed node and is responsible for communicating with the manager nodes. The agent has two main tasks: 1) to respond to requests from manager nodes and 2) to generate traps to inform manager nodes of certain events occurring at the node, such as a malfunction.

A manager node communicates with an agent by messages that are in the form of requests. The manager node does not need to know any internal details about the object managed by an agent. The agent does not need to know the context of the request. The agent validates the request, services it, and enters a passive state to await the next request.

Management information base (MIB) is an SNMP data structure that is used to store data relating to the managed nodes. MIB's describe objects by specifying the names, types, and the order of the fields that compose the objects. Relating to the accelerating system in accordance with the invention, a MIB may, for example, describe a statistical table mentioned above. When the GGSN, SGSN, and accelerating server have common MIBs they can communicate with each other and share information, such as load information and information about discarded packets.

The invention claimed is:

1. A method for accelerating at least one packet based transmission via a wireless network, said transmission comprising packet based transmission streams and said wireless network receiving retransmission requests and optional packet acknowledgements from wireless client devices, the method comprising the steps of:
providing at least one class set consisting of classes, each class specifying a certain type of transmission stream,
estimating the volume of unsuccessful transmission in the at least one class of a provided class set,
comparing the volume to a predefined level, and when the volume exceeds the predefined level,
selecting certain acceleration settings which define a certain subset of acceleration actions and targeting the certain subset of acceleration actions to a certain subset of transmission streams handled by the wireless network, and in order to reduce said volume and accelerate said transmission by reducing the number of retransmitted packets
executing the certain subset of acceleration actions for packets of the certain subset of said transmission streams, the certain subset of acceleration actions including at least one of the following acceleration actions:
filtering of the packets by removing bits from the packets;
prioritizing the packets by providing priority identifiers determining in which order the wireless network is allowed to discard the packets;
buffering the packets by temporarily placing the packets in a buffer before transferring them to the wireless network; and,
buffering the packets and then ordering the packets in the buffer in a predetermined order.

2. The method as defined in claim 1, wherein the volume is estimated by counting retransmission requests.

3. The method as defined in claim 2, wherein said class set comprises a statistical table in which each class of the class set contains data related to the current number of retransmission requests.

4. The method as defined in claim 1, wherein the volume is estimated by counting packets sent and packet acknowledgements.

5. The method as defined in claim 1, wherein said class set comprises a statistical table in which each class of the class set contains data related to the current number of packets sent and the current number of packet acknowledgements.

6. The method as defined in claim 1 further comprising the step of executing a certain subset of the acceleration actions depending on acceleration settings.

7. The method as defined in claim 1, wherein said transmission comprises image data; and wherein said certain subset of acceleration actions further comprises filtering by reducing the resolution of said image.

8. The method as defined in claim 1, wherein said transmission comprises image data; and wherein said certain subset of acceleration actions further comprises changing the image format.

9. The method as defined in claim 1, wherein said transmission information comprises image data and wherein said certain subset of accelerating actions further comprises transforming a color image to a monochrome or grayscale image.

10. The method as defined in claim 1, wherein said acceleration settings comprise operator settings and other settings, and wherein said operator setting take precedence over said other settings when the volume of unsuccessful transmission exceed a predetermined level.

11. The method as defined in claim 1, wherein said acceleration settings comprise settings selected from a group consisting of user-specific values, group-specific values, and content provider-specific values or a combination thereof.

12. The method as defined in claim 1, wherein the wireless network is a general packet radio services (GPRS) network.

13. The method as defined in claim 1, wherein the wireless network is a universal mobile telecommunications system (UMTS) network.

14. A system for accelerating at least one transmission stream via a wireless network, said transmission stream composed of packet based transmission streams and said wireless network receiving retransmission requests, and packet acknowledgements from wireless client devices, said system comprising:
an accelerating server having software comprising:
at least one class set consisting of classes, each class specifying a certain type of transmission stream and being responsive to measurement or estimate the volume of unsuccessful transmission of the certain type;
a comparison module for comparing the volume to a predetermined level,
a selection module to select certain acceleration settings which define a certain subset of acceleration actions and which target the certain subset of the acceleration actions to a certain subset of the transmission streams,
an acceleration execution module for executing the certain subset of acceleration actions for reducing the volume when the volume exceeds the predetermined level and for accelerating said transmission by reducing the number of retransmitted packets, the certain subset of acceleration actions including at least one of the following acceleration actions:
filtering of the packets by removing bits from the packets;
prioritizing the packets by providing priority identifiers determining in which order the wireless network is allowed to discard the packets;
buffering the packets by temporarily placing the packets in a buffer before transferring them to the wireless network; and,
buffering the packets and then ordering the packets in the buffer in a predetermined order.

15. The system as defined in claim 14, wherein the volume is estimated by counting retransmission requests.

16. The system as defined in claim 14, wherein said class set comprises a statistical table in which each class of the class set is related to the current number of retransmission requests.

17. The system as defined in claim 14, wherein said volume is estimated by counting packets sent and packet acknowledgements.

18. The system as defined in claim 14, wherein said class set composes a statistical table in which said each class of the class set is related to the current number of packets sent and the current number of packet acknowledgements.

19. The system as defined in claim 14, wherein said execution module is further adapted to execute a subset of the acceleration actions depending on the acceleration settings for ensuring user experience.

20. The system as defined in claim 14, wherein said transmission information comprises image data, and wherein said certain subset of acceleration actions further comprises filtering by reducing the resolution of said image.

21. The system as defined in claim 14, wherein said transmission comprises image data; and wherein said certain subset of accelerating actions further comprises changing the image format.

22. The system as defined in claim 14, wherein said acceleration settings comprise operator settings and other settings, and wherein said operator setting take precedence over said other settings when the volume of unsuccessful transmission exceed a predetermined level.

23. The system as defined in claim 14, wherein said acceleration settings comprise settings selected from a group consisting of user-specific values, group-specific values, and content provider-specific values or a combination thereof.

24. The system as defined in claim 14, wherein said accelerating server is coupled to said wireless network, said accelerating server adapted to receive packets from the fixed network and transmit the packets via a radio part to the wireless client devices.

25. The system as defined in claim 14, further adapted to utilize accelerating clients, each accelerating client installed in a wireless client device receiving packets transmitted by the accelerating server.

26. The system as defined in claim 14, further comprising a message interface between the accelerating server and a gateway GPRS support node (GGSN).

27. The system as defined in claim 14, further comprising a message interface between the accelerating server and a serving GPRS support node (SGSN).

28. The system as defined in claim 26, wherein the message interface is based on simple network management protocol (SNMP).

29. The system as defined in claim 14, wherein the wireless network is a general packet radio services (GPRS) network.

30. The system as defined in claim 14, wherein the wireless network is a universal mobile telecommunications system (UMTS) network.

31. The system as defined in claim 27, wherein the message interface is based on simple network management protocol (SNMP).

32. A method for accelerating packet based transmission streams via a wireless network, which transmits packets to wireless client devices, the method comprising the steps of:

providing at least one class set consisting of classes, each class specifying a certain type of transmission stream.

estimating the volume of network traffic in the at least one class of a provided class set;

comparing the volume to a predefined level, and when the volume exceeds the predefined level;

selecting certain acceleration settings defining a certain subset of acceleration actions and targeting the certain subset of acceleration actions to a certain subset of said transmission streams handled by the wireless network, and in order to reduce said volume and accelerate said transmission by reducing the number of retransmitted packets, executing the certain subset of acceleration actions for packets of the certain subset of transmission streams transmitted in the wireless network, the certain subset of acceleration actions including at least one of the following acceleration actions:

filtering of the packets by removing bits from the packets;

prioritizing the packets by providing priority identifiers determining in which order the wireless network is allowed to discard the packets;

buffering the packets by temporarily placing the packets in a buffer before transferring them to the wireless network; and, buffering the packets and then ordering the packets in the buffer in a predetermined order.

33. The method as defined in claim 32, wherein said class set comprises a statistical table in which at least one class of the class set contains data related to the network traffic volume of at least a portion of the network.

34. The method as defined in claim 32, wherein said transmission comprises image data; and wherein said certain subset of acceleration actions further comprises filtering by reducing the resolution of said image.

35. The method as defined in claim 32, wherein said transmission information comprises image data and wherein said certain subset of accelerating actions further comprises transforming a color image to a monochrome or grayscale image.

* * * * *